UNITED STATES PATENT OFFICE.

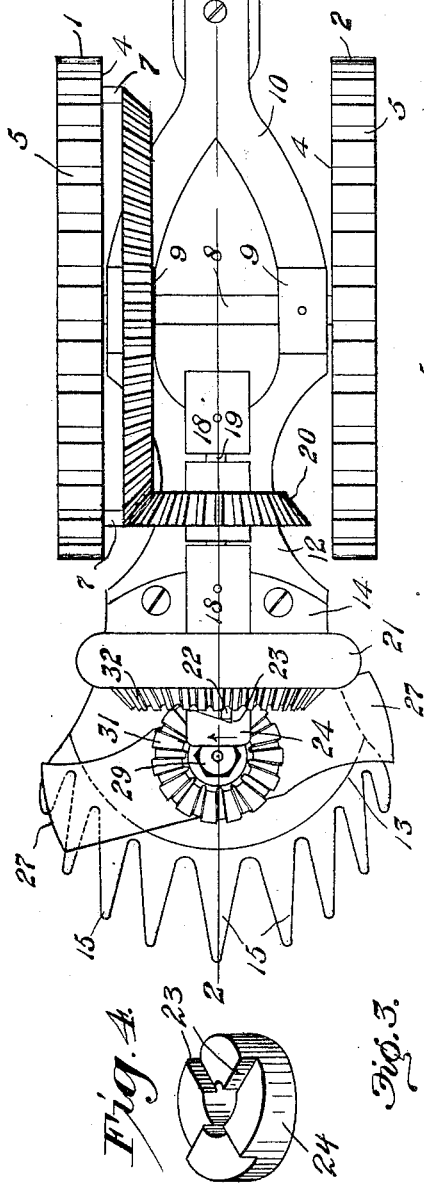
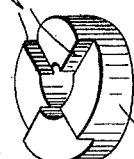
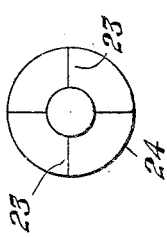
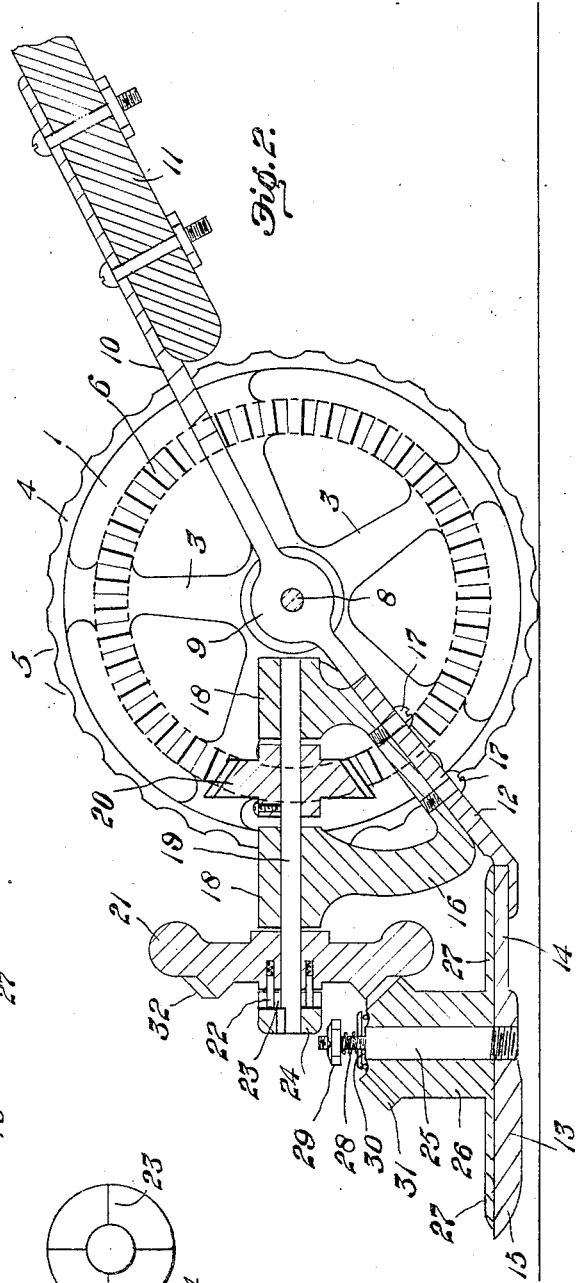

ERNEST E. MUZZY, OF CANTON, OHIO, ASSIGNOR OF ONE-HALF TO CHARLES H. RITTER-BUSH, OF CANTON, OHIO.

LAWN-TRIMMER.

1,351,185.  Specification of Letters Patent.  Patented Aug. 31, 1920.

Application filed May 17, 1919. Serial No. 297,719.

*To all whom it may concern:*

Be it known that I, ERNEST E. MUZZY, a citizen of the United States, residing at Canton, in the county of Stark and State of Ohio, have invented a new and useful Lawn-Trimmer, of which the following is a specification.

This invention relates to new and useful improvements in lawn trimmers and particularly to that class of lawn trimmers in which the cutting blades rotate over the cutter bar.

The object of the invention is to provide a lawn trimmer which is adapted for trimming the edges of lawns adjacent to fences, buildings, trees or shrubbery and in other places practically inaccessible to the ordinary lawn mower.

Another object is to provide a lawn trimmer which will be simple and of durable construction and which may be easily controlled by the operator so as to perform its work with certainty and precision.

A still further object is to provide a lawn trimmer of this character in which the rotary cutting blades are operatively connected with the driving wheels of the trimmer and in which the cutting blades will continue to rotate for some considerable time after the trimmer has been brought to a stop in order to more efficiently trim the edges of the lawn adjacent to walls or buildings where it is not possible to continue the movement of the trimmer.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims, without departing from the spirit or sacrificing any of the advantages of the invention.

The invention thus set forth in general terms is illustrated in the accompanying drawings forming part hereof, in which—

Figure 1 is a plan view of the lawn trimmer embodying the invention.

Fig. 2 is a longitudinal sectional view of the same taken on line 2—2, of Fig. 1, the blades 27 being arranged in Fig. 2 at substantially right angles to the positions which they occupy in Fig. 1;

Fig. 3 is a face view of the ratchet; and

Fig. 4 is a detail perspective view of the ratchet.

A practical embodiment of the invention is disclosed in the accompanying drawings, forming a part of this specification in which similar numerals of reference indicate corresponding parts throughout the several views.

More specifically describing the construction shown in the said drawings, the numerals 1 and 2 indicate the two driving wheels, which are provided with the spokes 3 upon their outer sides, the flanges 4 extending inwardly from said spokes. Externally the flanges 4 are provided with transverse grooves 5 or an equivalent roughened surface for the purpose of producing better purchase or traction on the ground. The wheel 1 is provided with the bevel gear 6 spaced therefrom and connected thereto by means of the lugs 7. The wheels 1 and 2 are fixed upon the shaft 8, said shaft being journaled in suitable bearings 9 mounted upon the frame 10 to which frame is connected a handle 11 by means of which the trimmer is moved upon the surface of the ground.

The frame 10 is provided with the downwardly disposed cutter bar carrying portion 12 to which the lower stationary cutter bar 13 is connected in any suitable and well known manner, said cutter bar comprising the back portion 14 and the forward extending spaced stationary blades 15 formed integrally with said back.

The balance shaft frame 16 is connected to the cutter bar frame by means of screws 17 or their equivalents and is provided with a pair of spaced bearings 18 within which is journaled the balance shaft 19, said shaft being provided with the fixed pinion 20 meshing with the bevel gear 6, which is carried by the driving wheel 1. A balance wheel 21 is rotatably mounted upon said balance shaft and provided with a pair of spring pressed pins 22 arranged to engage the recesses 23 in the face of the ratchet member 24 which is fixedly connected to the balance shaft.

The back portion 14 of the lower cutter bar carries an upwardly disposed stud 25 upon which is rotatably mounted the sleeve 26 carrying the rotary cutter blades 27. Tension is placed upon the rotary cutter blades by means of a coil spring 28 located between the adjusting nut 29 and the shoulder 30 of the sleeve 26 tending to hold the rotary cutter blades in tight engagement with the stationary cutter bar.

The pressure of the rotary cutter blades upon the stationary cutter bar may thus be regulated by the adjusting nut 29 and the spring 28 acts to give a yielding downward pressure to the said rotary cutter blades, thus assuring satisfactory cutting action at all times. A beveled gear 31 is formed upon the sleeve 26 and meshes with the beveled gear 32 formed upon the balance wheel 21.

The operation of the device is as follows: As the lawn trimmer is moved forward upon the surface of the lawn the rotary cutter blades 27 will be rapidly rotated over the face of the stationary cutter bar through the medium of the gearing above described, the pins 22 being held in the recesses 23 in the ratchet member, thus causing the balance wheel 21 to be rotated with the rotation of the shaft 19. As the forward movement of the trimmer is stopped the momentum of the balance wheel 21 will cause the rotary cutter blades to be rotated for some considerable time, the spring pressed pins 22 riding over the beveled faces of the recesses 23, thus allowing edges of the lawn adjacent buildings or walls to be easily and neatly trimmed.

Although the drawings and above specification disclose the best mode in which I have contemplated embodying my invention I desire to be not limited to the details of such disclosure, for, in the further practical application of my invention, many changes in form and construction may be made, as circumstances require or experience suggests, without departing from the spirit of the invention, within the scope of the appended claims.

I claim:

A lawn trimmer comprising a frame, a driving wheel mounted thereon, a stationary cutter bar, a rotary cutter bar coöperating therewith, a balance shaft operatively connected to said driving wheel, a ratchet member provided with beveled recesses carried by said balance shaft, a balance wheel rotatably mounted upon said balance shaft, spring pressed pins carried by said balance wheel and arranged to engage the depressions in said ratchet member and means operatively connecting the balance wheel with the rotary cutter bar, the momentum of the balance wheel thus causing the cutter bar to rotate for a number of revolutions after the driving wheel is brought to a stop.

In testimony that I claim the above I have hereunto subscribed my name.

ERNEST E. MUZZY.